United States Patent [19]

Maget

[11] 4,402,817
[45] Sep. 6, 1983

[54] ELECTROCHEMICAL PRIME MOVER

[76] Inventor: Henri J. R. Maget, 80 Arbuelo Way, Los Altos, Calif. 94022

[21] Appl. No.: 320,552

[22] Filed: Nov. 12, 1981

[51] Int. Cl.$^3$ ............................................. B01D 13/02
[52] U.S. Cl. ................................ 204/301; 204/180 P; 204/299 R
[58] Field of Search ................ 204/180 P, 299 R, 301

[56] References Cited

U.S. PATENT DOCUMENTS

| | | | |
|---|---|---|---|
| 3,427,978 | 2/1969 | Hanneman | 103/1 |
| 3,489,670 | 1/1970 | Maget | 204/301 |
| 3,706,013 | 12/1972 | Bourgault | 317/231 |
| 3,893,904 | 7/1975 | Hadermann et al. | 204/301 |
| 4,118,299 | 10/1978 | Maget | 204/301 |

*Primary Examiner*—Howard S. Williams
*Assistant Examiner*—Terryence Chapman
*Attorney, Agent, or Firm*—Thomas H. Olson

[57] ABSTRACT

A prime mover or motor having one or more compartments in which pressure variations are produced by transporting molecules into and out of the compartment by means of an electrolytic membrane. Devices for converting the pressure changes to mechanical movement are disclosed; the devices effect conversion to mechanical motion without adversely affecting the sealed condition of the compartment. The mechanical motion produced by the apparatus of the invention is typically reciprocating linear motion and means are disclosed for converting such motion into a pumping function, a rocking function or a rotating function.

Disposed within the compartments is an electrochemically active material that can exist in the gaseous phase and that can enter into an oxidation/reduction reaction in order to form ions that move across an electrolytic membrane so as to increase or decrease pressure in a compartment in response to application of a voltage gradient of proper duration and polarity across the membrane. Hydrogen is one suitable material for use in the apparatus.

13 Claims, 6 Drawing Figures

4,402,817

ELECTROCHEMICAL PRIME MOVER

BACKGROUND OF THE INVENTION

1. Field of the Invention

This invention relates to a prime mover and more particularly to a prime mover which exploits pressure increases and decreases induced by converting molecules of electrochemically active material to ions, transporting the ions through an electrolytic membrane and reconverting the ions to molecules.

2. Description of the Prior Art

U.S. Pat. No. 3,489,670 discloses a process for gas purification in which a gas composed of hydrogen and various contaminants is introduced into a chamber bounded by an ion exchange membrane. A voltage gradient is established across the membrane, and the hydrogen molecules within the gas are ionized so that they pass through the membrane and are extracted from the opposite side of the membrane. The contaminants are not ionized and therefore do not pass through the membrane. The process can also be employed in providing hydrogen for a fuel cell.

U.S. Pat. No. 4,118,299 discloses an electrochemical water desalination process in which water containing salt and other contaminants is mixed with hydrogen gas. The mixture is introduced into a chamber bounded by an ion exchange membrane across which a voltage gradient is established. The hydrogen molecules are ionized and pass through the membrane. During passage of the hydrogen ions through the membrane, water is entrained with the ions so that at the opposite side of the membrane, hydrogen and pure water are produced. The hydrogen in gaseous form is pumped back for reuse. U.S. Pat. No. 4,118,299 discloses that the hydrogen ions under the influence of the voltage gradient will be transported from a low pressure environment on one side of the membrane to a high pressure environment on the other side of the membrane.

An article entitled "Hydrogen Electrolysis Cell" by Sedlak et al, International Journal of Hydrogen Energy, Volume 6, pp 45–51, Pergamon Press, Ltd., 1981, makes reference to the above cited U.S. Patents and describes experiments in recovering hydrogen from water by employment of an electrolytic cell that includes an ion exchange membrane.

Although the above cited prior art references disclose passage of hydrogen ions through a membrane across which a voltage gradient is established, none utilizes the pressure changes caused by depletion or increase of hydrogen molecules on respective sides of the membrane to perform mechanical work.

SUMMARY OF THE INVENTION

The embodiments of the invention that are described in more detail hereinafter include at least two gas-tight compartments that are separated by an electrolytic membrane, such as an ion exchange membrane. The surfaces of the membrane that form partial boundaries of each of the chambers are provided with electrodes so that a voltage gradient can be established across the membrane to induce current flow therethrough. The compartments are filled with an electrochemically active material that can be ionized at the electrodes. When current flow is induced through the membrane, in response to establishment of a voltage gradient therein, molecules of the electrochemically active material are ionized, travel through the membrane and are reconverted to molecules in the other compartment, thereby increasing the pressure in one of the compartments and decreasing the pressure in the other compartment. Means are provided in operative association with the compartments for converting these pressure changes to mechanical motion which can be used for driving a pump or any other mechanical load.

Because electrolytic membranes are available in extremely thin structures, the voltage necessary to activate a prime mover according to the invention is extremely small so that a prime mover incorporating the invention can be powered by conventional dry batteries and therefore provide a high degree of portability.

A feature and advantage of the invention is that the increase and/or decrease of pressure in the compartments is accomplished without moving parts to the end that no friction losses are present and substantial longevity is achieved.

Another feature and advantage of the invention arises from the employment in association with one or more of the compartments of a bellows structure for converting the pressure changes into mechanical motion. The bellows structure assures a virtually perfect seal between the compartments and the environment in which the device is operated which seal is long lasting and maintenance free.

Yet another feature and advantage of the invention is that plural cells can be connected in series electrically and in parallel mechanically so that virtually any pumping capacity can be achieved and any power supply voltage can be accommodated.

The foregoing, together with other objects, features and advantages will become more apparent after referring to the following specification and the accompanying drawings.

DETAILED DESCRIPTION OF THE PREFERRED EMBODIMENTS

Figure 1:
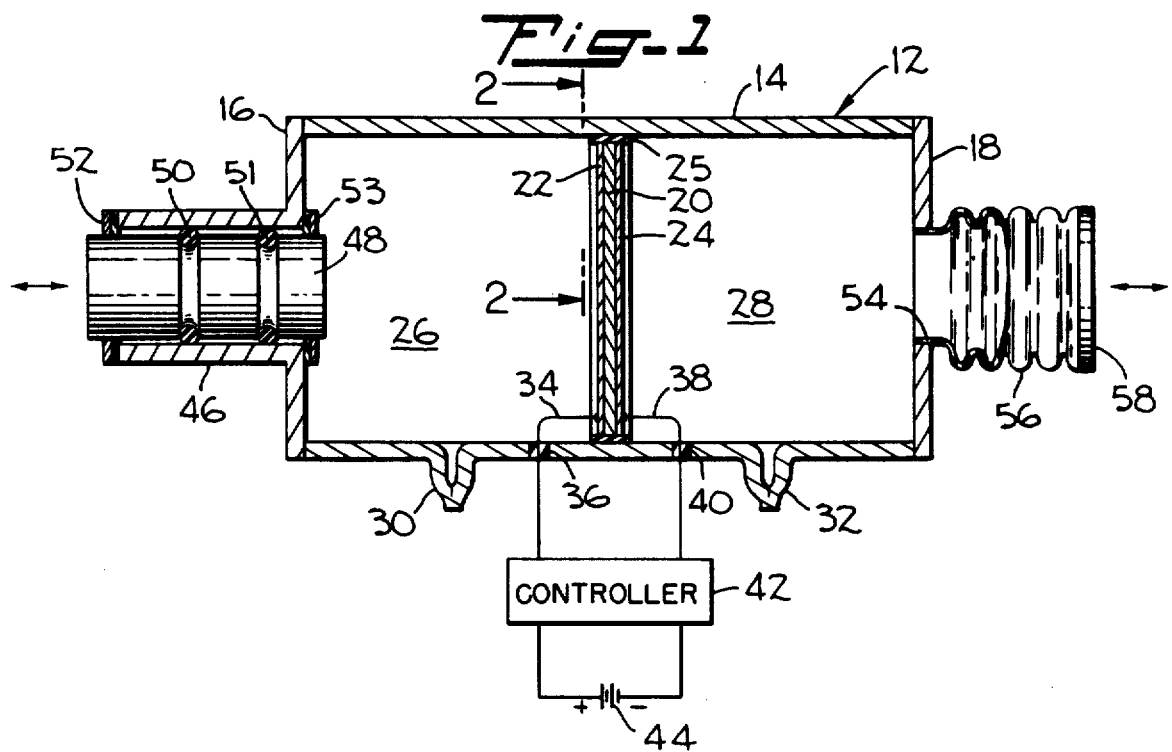
FIG. 1 is an elevation view in cross-section of a prime mover according to the invention which provides reciprocating mechanical motion, portions being shown out of scale for clarity.

Referring more particularly to the drawings, reference numeral 12 indicates a gas-tight chamber having a side wall 14 and opposite end walls 16 and 18. Side wall 14 is cylindrical, but can be any other suitable cross-sectional shape. The walls are formed of metal in the specific embodiment of FIG. 1, but can be any other suitable material such as plastic, glass or like gas-tight material. Approximately midway between the end walls within chamber 12 is fixed an electrolytic membrane 20. Various forms of electrolytic membranes are disclosed in more detail below and in the prior art references previously cited.

On opposite surfaces of membrane 20 conductive electrodes 22 and 24 are disposed. The electrodes can be formed of a titanium-palladium alloy in the form of a mesh, palladium black in the form of a thin coating on the respective surfaces of membrane 20 or any other material that is electrically conductive and acts as a catalyst in converting molecules of the electrolytic material in chamber 12 to ions in response to a voltage gradient applied across membrane 20. Membrane 20 and electrodes 22 and 24 are supported in an insulative sleeve 25; the sleeve can be eliminated if side wall 14 is constructed of insulative material, such as glass.

Bounded by electrode 22, end wall 16 and the left hand portion of side wall 14 is a compartment 26; bounded by electrode 24, end wall 18 and the right hand portion of side wall 14 is a compartment 28. Wall 14 is provided with tubulations 30 and 32 which communicate with the respective compartments and permit introduction of appropriate materials into the compartments during manufacture of the device.

There is a conductor 34 which is electrically connected to electrode 22 and extends through a suitable seal 36 to the exterior of chamber 12. There is another conductor 38 which is connected to electrode 24 and extends through a seal 40 to the exterior of chamber 12. Conductors 34 and 38 are connected to an electrical controller 42 which is powered by a battery 44. Controller 42 can be a simple timed reversing switch or can be a wave generator capable of producing alternate positive and negative voltage signals of varying shape and repetition rate, the specific configuration of controller 42 depending on the load driven by the prime mover of the invention.

In the embodiment seen in FIG. 1, there are disclosed two structures for converting the pressure changes within compartments 26 and 28 to mechanical motion. In association with compartment 26 there is a tubular extension 46 extending from end wall 16. The tubular extension has an inner end in communication with compartment 26 and an outer end communicating with the ambient environment in which the device is installed. Tubular extension 46 defines a passage of constant cross-sectional shape in which is supported a piston 48. O-ring seals 50 and 51 are provided on the exterior surface of piston 48, and sliding annular seals 52 and 53 are provided at opposite ends of tubular extension 46 so that compartment 26 is maintained in a gas-tight condition. Thus, as the pressure in compartment 26 increases, piston 48 moves outward (toward the left as viewed in FIG. 1) and as the pressure within the compartment decreases, the piston moves inward (toward the right as viewed in FIG. 1).

End wall 18 is provided with an opening 54, and fixedly sealed to the margin of the opening is a bellows structure 56. At the outer end of the bellows structure a closure plate 58 is provided so that compartment 28 is maintained in a gas-tight condition. As the pressure within compartment 28 increases, bellows 56 expands and closure plate 58 moves outward (toward the right as viewed in FIG. 1), and as the pressure within compartment 28 decreases, the bellows contracts and plate 58 moves inward (toward the left as viewed in FIG. 1).

Loads connected to piston 48 and/or closure plate 58 are accordingly subjected to reciprocating motion in response to increase and decrease of pressure within compartments 26 and 28.

The specific construction of electrolytic membrane 20 depends upon the electrochemically active material that is employed in the device. The device can operate on any redox couple that contains material capable of existing in a gaseous phase and that is electrochemically reversibly active so as to react at one of the electrodes 22, 24 to produce ions which can migrate across the electrolytic membrane and be reconverted at the opposite electrode into a molecular state.

One example of a suitable redox couple is wherein both species of the couple are molecular hydrogen ($H_2/H_2$) in gaseous form. The process by which hydrogen molecules are moved from one compartment to the other through membrane 20 is well described in the above cited prior art references. If, for example, controller 42 establishes electrode 24 at a potential that is higher than electrode 22, electrode 22 functions as a cathode and electrode 24 functions as an anode. At electrode 22, a cathodic reaction represented by the following equation occurs:

$$2H^+ + 2e^- \rightarrow H_2$$

At electrode 24, an anodic reaction represented by the following equation occurs:

$$H_2 \rightarrow 2H^+ + 2e^-$$

The net result of the foregoing is that hydrogen molecules in compartment 28 are converted to ions, the ions move through membrane 20 under the influence of the voltage gradient thereacross. At electrode 22, the cathodic reaction reconverts the ions to molecules so that the pressure in compartment 26 is increased and the pressure in compartment 28 is decreased. When the polarity is reversed by action of controller 42, the molecules move from compartment 26 back to compartment 28 in accordance with the phenomena defined by the above equations.

Another suitable redox couple is oxygen and water ($O_2/H_2O$). In response to an appropriately polarized voltage gradient across membrane 20, water in a first compartment on one side of the membrane is electrolyzed. Hydrogen ions are formed at the electrode that bounds such compartment and those ions are caused to move across the membrane leaving gaseous oxygen in the first compartment; the pressure in the first compartment is thereby increased. When the hydrogen ions reach the second compartment they recombine with oxygen at the other electrode so as to form water in the second compartment. In response to such recombination in the second compartment, the pressure in the second compartment is reduced. Thus, the desired pressure increase in one compartment concurrent with pressure decrease in the other compartment is achieved with the redox couple of oxygen and water. Other suitable redox couples are chlorine and hydrochloric acid ($Cl_2/HCl$), bromine and hydrobromic acid ($Br_2/HBr$), iodine and hydriodic acid ($I_2/HI$), which are redox couples composed of a halogen and a halogen acid, and chlorine and lithium chloride (Li/LiCl).

Figure 6:
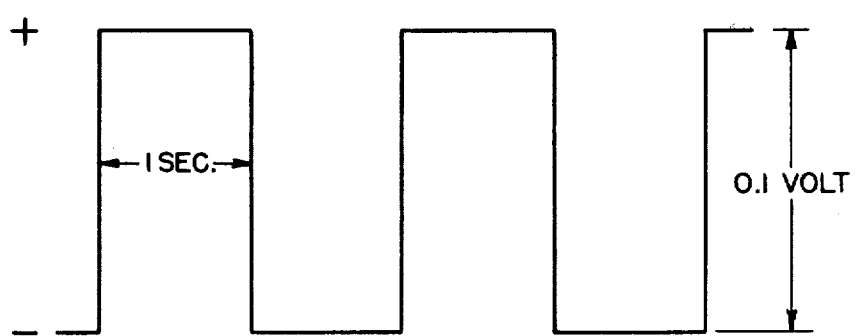
FIG. 6 is a plot of time versus voltage for one suitable operating sequence according to the invention.

A typical repetition rate for controller 42 provides for one second of a voltage gradient across membrane 20 of one polarity followed by a one second interval of a voltage gradient of opposite polarity, as depicted in FIG. 6. In one apparatus designed in accordance with the invention electrodes 22 and 24 have a thickness of about 0.002–0.003 inches, membrane 20 has a thickness of about 0.010 inches and the electrodes have a cross-sectional area of about one square centimeter. A voltage of about 0.1 volt causes a current flow through the membrane of about one ampere and at a rate of about one polarity reversal per second; the device having a membrane area of about one square centimeter can pump about 400 cubic centimeters of hydrogen per hour. In such exemplary system, the pressure in the compartments can vary from about one atmosphere to about three atmospheres.

The voltage vs. time pattern depicted in FIG. 6 is only examplary. Controller 42 can be adapted to produce voltage vs. time patterns of virtually any shape, thus permitting time regulated or programmed motion of piston 48 and closure plate 58 to take place. This in term permits exploitation the characteristic of the device that, contrary to conventional motors, the device becomes more efficient as the current decreases.

Figure 2:
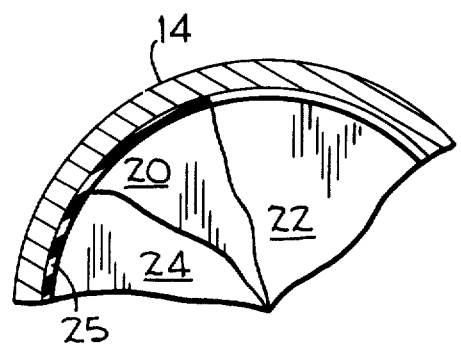
FIG. 2 is a fragmentary sectional view taken along line 2—2 of FIG. 1.
Figure 3:
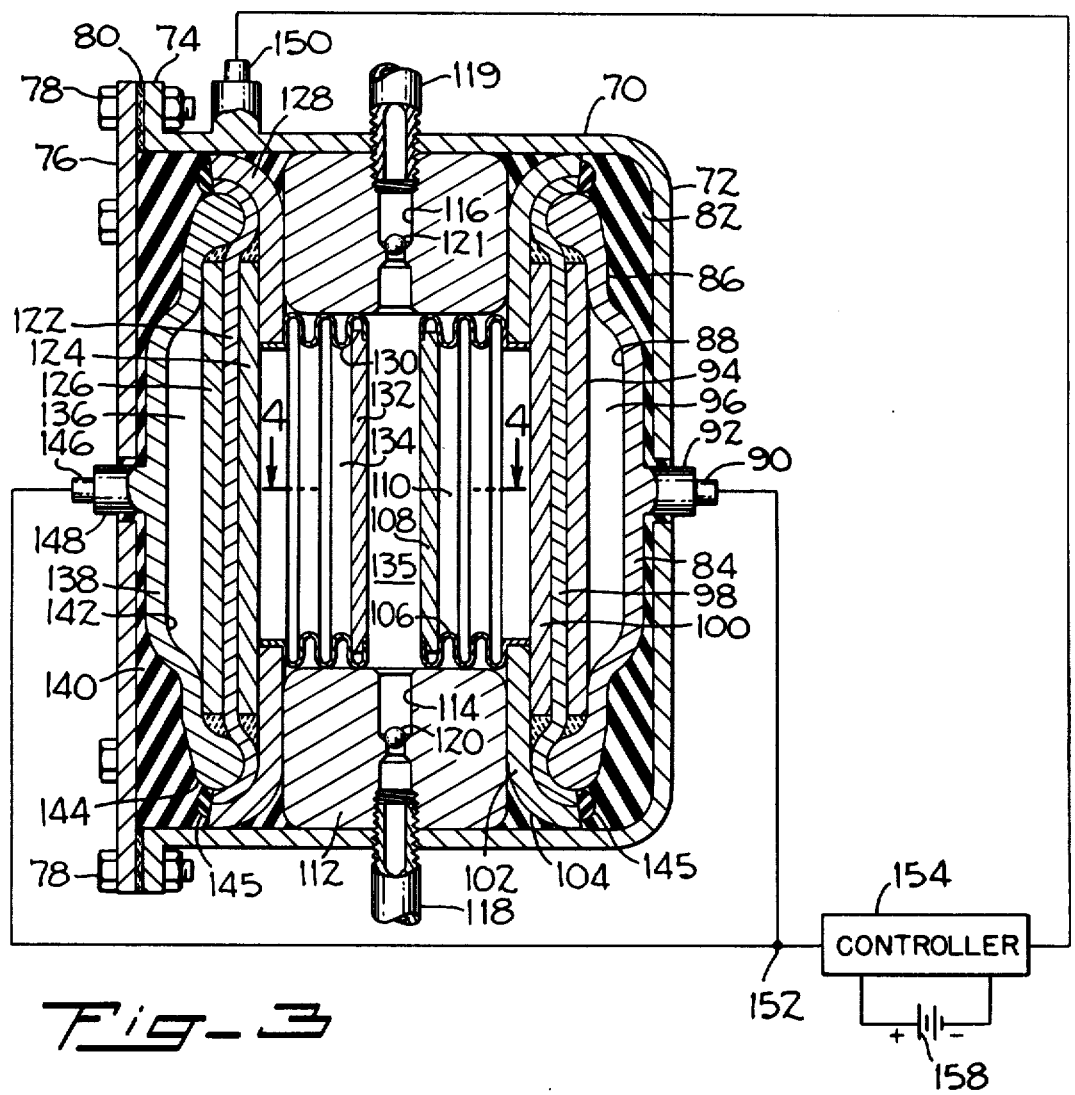
FIG. 3 is an elevation view in cross-section showing a prime mover according to the invention embodied as a fluid pump, portions being shown out of scale for clarity.
Figure 4:
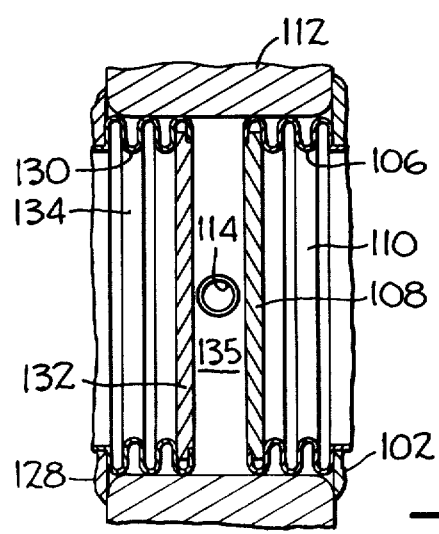
FIG. 4 is a fragmentary cross-section taken along line 4—4 of FIG. 3.

Referring now to FIGS. 3 and 4, there is a metal casing 70 which is of cylindric form and which has an integral end plate 72. Casing 70 on the end opposite from end plate 72 has an outward extending flange 74 and there is an end plate 76 fastened to the flange by means of bolts 78. A gasket 80 between flange 74 and plate 76 assures that the chamber defined by housing 70 is gas-tight. At the right hand end of the chamber and in contact with the inner surface of end wall 72 is an insulative body 82. On the surface of insulative body 82 remote from end wall 72 there is a conductive dish-shaped member 84 which has a circular peripheral portion 86 and a central concave portion 88. Centrally of concave portion 88 is an electrical terminal 90 which is surrounded by a bushing 92 to insulate the terminal and the dish-shaped plate from casing 70. In contact with the peripheral portion 86 of the dish shaped member is an electrode 94 which is of similar material and function to electrodes 22 and 24 described previously in connection with FIGS. 1 and 2. There is a compartment 96 defined between dish-shaped member 86 and electrode 94; the compartment is filled with hydrogen or the like.

Electrode 94 is disposed in intimate contact with an ion exchange membrane 98 on the opposite surface of which is disposed an electrode 100. Electrode 100 is similar to electrode 94 and ion exchange membrane 98 is similar to that described hereinabove with respect to FIG. 1. There is an annular contacter 102 which defines a central opening and has a marginal portion in electrical contact with electrode 100. Contacter 102 has a curved peripheral portion 104 which contacts the inner wall of casing 70 to establish electrical contact between the casing and electrode 100 and to assist in retaining the parts of the device immovably within the casing. Contacter 102 defines a central circular opening to the margin of which is fixed a gas-tight bellows structure 106. At the end of bellows 106 remote from contacter 102 there is a circular closure plate 108 which in conjunction with the bellows and electrode 100 defines a compartment 110.

In contact with annular contacter 102 is one axial surface of an annular insert 112. The insert has an outer periphery adapted for a sliding fit within the chamber defined by casing 70 and defines an inner cylindrical shaped central opening of a diameter slightly greater than the outer diameter of bellows 106 so that bellows can expand and contract within the central opening. Insert 112 defines a radially extending inlet bore or passage 114 and a radially extending outlet bore or passage 116. In the specific embodiment shown in FIGS. 3 and 4, bores 114 and 116 are diametrically aligned with one another. An inlet fitting 118 is provided in casing 70 for establishing communication with bore 114 and an outlet fitting 119 extends through the casing and affords communication with outlet bore 116. The fittings also serve to support insert 112 immovably in casing 70. Within inlet bore 114 has a check valve 120 is disposed; the check valve is oriented to permit fluid flow only in a direction from inlet fitting 118 toward the interior of the device. Within outlet bore 116 a check valve 121 is disposed; the check valve is oriented to permit fluid flow only in a direction from the interior of the device toward outlet fitting 119.

On the left hand side of the device shown in FIG. 3 is structure substantially symmetrical or identical to that shown on the right hand side. There is an ion exchange membrane 122 on the inner surface of which there is an electrode 124 and on the outer surface of which is an electrode 126. A contacter 128 establishes electrical contact between electrode 122 and casing 70 and defines a central opening to which a bellows 130 is attached. A closure plate 132 spans the extremity of the bellows remote from electrode 124 so as to form a compartment 134. As can be seen, closure plate 132 is parallely spaced from closure plate 108. A pumping chamber 135 is formed between closure plates 108 and 132.

A compartment 136 is formed between electrode 126 and a cup-shaped retainer 138. Retainer 138 is supported by an insulative body 140, the outer or left hand extremity of which bears against the inner surface of plate 76. Retainer 138 is substantially identical to retainer 134 and has a central concave portion 142 and an outer peripheral portion 144 which makes electrical contact with electrode 128. Surrounding the periphery of membranes 98 and 102 are beads 145 of a suitable sealant such as silicone rubber. The bead prevents evaporation from the edge of the membrane and assists in retaining the elements of the device in place.

A terminal 146 is connected to the center of retainer 138 and there is an insulative bushing 148 through which the terminal extends to the exterior of the casing without establishing electrical contact with the casing. There is a terminal 150 which is attached to and electrically connected to casing 70. Because electrodes 100 and 124 are connected to the casing, connection to terminal 150 establishes a circuit to those electrodes.

A conductor 152 connects terminals 90 and 146 to one terminal of a controller 154 which is substantially identical to controller 42 previously described in connection with FIG. 1. A conductor 156 connects terminal 150 to the other terminal of the controller. The controller is adapted to supply suitable electrical signals between the terminals and can be powered by a battery 158.

In describing the operation of the embodiment of FIG. 3, it will be assumed that the potential applied by controller 154 to conductor 152 is positive with respect to the potential applied to conductor 156 so that electrodes 94 and 126 function an anodes and electrodes 100 and 124 function as cathodes. Accordingly, hydrogen molecules in compartments 96 and 136 are converted to ions by respective electrodes 94 and 126. Under the influence of the voltage gradient across membranes 98 and 122 the ions move through the membranes and are reconverted to molecules by respective electrodes 100 and 124. The consequence of this is that the pressure within compartments 110 and 134 increases. Increase of pressure in the latter chambers causes pumping plates 108 and 132 to move toward one another, the elasticity within bellows 106 and 130 permitting such movement. Movement of plates 108 and 132 toward one another decreases the volume of pumping chamber 135 and forces fluid therein through outlet fitting 119. Fluid flow through inlet fitting 118 is prevented by the presence of check valve 120 in inlet bore 114.

After a suitable period, e.g., one second, controller 154 reverses the polarity of the voltage signal applied to the electrodes so that electrodes 100 and 124 function as anodes and electrodes 94 and 126 function as cathodes. This causes ionization of hydrogen molecules in chambers 110 and 134 at electrodes 100 and 130, movement of the ions through the respective membranes 98 and 124, reconversion of the ions to molecules at electrode 94 and 126, and consequent decrease of pressure in compartments 110 and 134. The pressure in compartments 96 and 136 experienced a corresponding increase. Decrease of pressure in compartments 110 and 134 causes closure plates 108 and 132 to move away from one another in response to the elasticity in bellows 106 and 130. This results in movement of fluid from inlet fitting 118 into pumping chamber 135. Back flow of fluid from outlet fitting 119 is prevented by the presence of check valve 121 in outlet bore 116. The foregoing polarity reversals are continued as indicated in FIG. 6 to achieve pumping of fluid from inlet fitting 118 to outlet fitting 119. The rate of pumping can be controlled by controlling the repetition rate and shape of the electrical voltage signal produced by controller 154.

Figure 5:
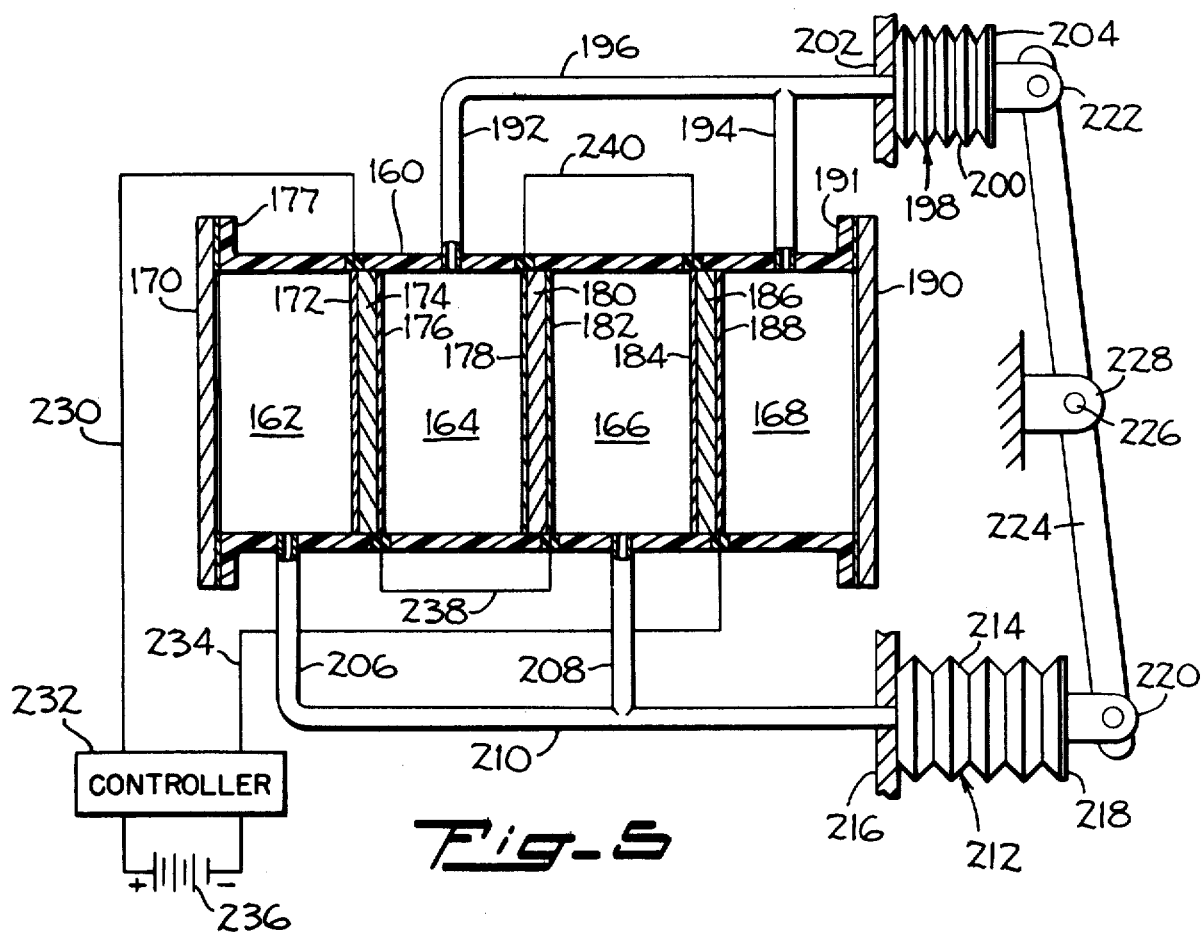
FIG. 5 is an elevation view in cross-section showing a prime mover of the invention which employs a plurality of individual units electrically connected in series and mechanically connected in parallel, portions being shown out of scale for clarity.

The embodiment of FIG. 5 demonstrates that a plurality of prime movers embodying the present invention can be combined with one another. More specifically, in the embodiment of FIG. 5, the prime movers are electrically connected in series and mechanically connected in parallel.

In FIG. 5 there is a gas-tight casing 160 which can have a cylindrical shape. The interior of casing 160 defines four compartments 162, 164, 166 and 168. Compartment 162 is bounded at one end (the left end as viewed in FIG. 5) by an end plate 170 and at the other end by an electrode-membrane structure formed by an electrode 172, a membrane 174 and electrode 176 on the side of membrane 174 opposite from electrode 172. End plate 170 is attached to casing 160 by means of a flanged joint 177. The membrane-electrode structure formed by elements 172-176 forms one boundary of compartment 164; the other boundary of the compartment is formed by a membrane-electrode structure composed of an electrode 178, a membrane 180 and an electrode 182 disposed on the side of the membrane opposite from electrode 178. The membrane-electrode structure formed by elements 178-182 constitutes the left hand boundary of compartment 166; the right hand boundary is formed by a membrane-electrode structure composed of an electrode 184, a membrane 186 and an electrode 188 disposed on the side of membrane 186 opposite from electrode 184. The membrane-electrode structure formed by elements 184-188 form one boundary of compartment 168 and an end wall 190 forms the other boundary. End plate 190 is attached to casing 160 by means of a flanged joint 191. The showing in FIG. 5 of four compartments and three membrane-electrode structures is only exemplary because virtually any number of elements can be combined in practicing the present invention.

In communication with compartments 164 and 168 are conduit branches 192 and 194 which communicate with a main conduit 196, the distal end of which is coupled to a bellows structure 198. The bellows structure includes an elastically expanding bellows side wall 200, one end of which is mounted to a base 202 and the other end of which supports a closure plate 204 so that increases and/or decreases of pressure in main conduit 196 will cause expansion or contraction of the bellows structure, i.e., movement of plate 204 away from or toward base 202. In communication with compartments 162 and 166 are branch conduits 206 and 208 which communicate with a main conduit 210. Conduit 210 communicates with a bellows structure 212 which includes an expandable bellows side wall 214, a base 216 and an end closure 218.

Fixed to end plate 218 is a gudgeon 220 and there is a corresponding gudgeon 222 fixed to end plate 204. A rocking beam 224 is pivotally pinned at its opposite end to the gudgeons and the midpoint of the rocking beam is secured to a shaft 226 which is pivotally supported by a bracket 228.

There is a conductor 230 connected between electrode 172 and one terminal of a controller 232, which is equivalent to controller 42 described previously in connection with FIG. 1. There is also a conductor 234 connected between electrode 188 and controller 232. Controller 232 is adapted to supply voltage signals to conductors 230 and 234 of appropriate shape and repetition rate, such as depicted in FIG. 6, and can be powered by a battery 236. Finally, there is a conductor 238 connected between electrodes 174 and 182 and a conductor 240 connected between electrodes 178 and 184, whereby all three membrane electrodes are connected in series.

The embodiment of FIG. 5, as is the case with the embodiments previously described, is filled with a gas whose active ingredient is essentially of hydrogen so that, as the membrane-electrode structures within casing 160 are energized from controller 232, the hydrogen is ionized at one electrode, passes through the membrane and is reconverted to molecular hydrogen at the other electrode. More specifically and assuming that the potential on conductor 234, hydrogen moves from chambers 162 and 166 to chamber 164 and from chamber 166 into chamber 168. This causes a pressure increases to be applied through branch conduits 192 and 194 and main conduit 196 to bellows structure 198. Accordingly, the bellows is expanded, and rocking beam 224 and shaft 226 rotate in a clockwise direction as viewed in FIG. 5. Concurrent with the foregoing, hydrogen is depleted from chambers 162 and 166 thereby creating a relatively low pressure in branch conduits 206 and 208, main conduit 210, and bellows structure 212. This effects contraction of the latter bellows structure which produces a clockwise moment on rocking beam 224 that is additive to that provided by bellows structure 198. After an appropriate interval, e.g., one second, controller 232 reverses the polarity of the conductors so that the potential on conductor 234 is greater than that on 230. In response to the latter, hydrogen is moved from chamber 164 to chambers 162 and 166 and from chamber 168 to chamber 166. The reverse action occurs, i.e., bellows structure 212 is expanded and bellows structure 198 is contracted, thus subjecting rocking beam 224 to counter clockwise movement as viewed in FIG. 5. Power can be taken directly from shaft 226, or if unidirectional rotation is desired, power can be taken through ratchet-pawl mechanism or an overrunning clutch. Accordingly, the device seen in FIG. 5 illustrates that the individual membrane-electrode structures of the invention can be cascaded and can supply transducers that are located remote from the prime mover structure. The series electrical connection between the membrane-electrode permits use of commercially available dry cell batteries because sufficient membrane-electrode structures can be connected in series to accommodate the cell voltage.

In certain applications it is desirable to fill the compartments with substantially pure hydrogen. In other cases where depletion of hydrogen from a compartment would produce unacceptably low pressures, the hydrogen can be mixed with an inert gas to which the membrane is impervious, nitrogen exemplifying a suitable gas for the purpose. Thus, in a system where a hydrogen-nitrogen mixture is employed, the nitrogen remains in the compartment in which it is placed thereby providing a preselected residual pressure even when all hydrogen is depleted from the compartment.

In a typical example of the invention, after the device is fabricated, air is evacuated therefrom and hydrogen, with or without an inert gas, is introduced into the device compartments to a pressure of about two atmospheres. One suitable mode of operation is to polarize the membrane-electrode structures in one sense until the pressure on one side of the membrane-electrode structure is about three atmospheres and the pressure on the other side is about one atmosphere. Thereafter, the polarity is reversed to effect transportation of hydrogen in the opposite direction.

A prime mover according to the invention can be constructed in a wide range of sizes from an extremely small device having a cross sectional area of about one centimeter to devices substantially larger. Because the invention affords implementation in such a miniature device utilizing battery power sources, it lends itself to implantation or installation at inaccessible locations.

Although several embodiments of the invention have been shown and described, it will be obvious that other adaptations and modifications can be made without departing from the true spirit and scope of the invention.

What is claimed is:

1. A prime mover comprising means defining a gas-tight chamber, an electrolytic membrane disposed in said chamber, said membrane having a first surface and a second surface spaced from said first surface in substantial parallelism thereto, said membrane being fixed within said chamber so as to form a first compartment bounded in part by said first surface and a second compartment bounded in part by said second surface, a first material pervious electrode disposed on said first membrane surface and a second material pervious electrode disposed on said second membrane surface, said compartments containing an electrochemically active material capable of existing in a gaseous phase and being electrochemically reversibly active so as to enter into a reduction/oxidation reaction at said electrodes and produce ions that are transportable through said membrane, means connected to said electrodes for inducing unidirectional current flow between said electrodes through said membranes so as to ionize said electrochemically active material at one said electrode and transport ions through said membrane from said first compartment to said second compartment thereby effecting a pressure increase in one of said compartments and a pressure reduction in the other said compartment, means operatively associated with at least one of said compartments for converting the pressure change therein to mechanical motion, and means for periodically reversing the polarity of said current flow inducing means to periodically reverse the direction of ion transportation through said membrane.

2. A prime mover according to claim 1 wherein said converting means includes a hollow tubular member fixed to said chamber defining means and having an inner end communicating with said first compartment and an outer end exterior of said chamber, a piston disposed in said hollow tubular member for movement therealong and means for forming a sliding air-tight seal between said piston and said tubular member so that said tubular member moves toward said first end in response to reduction of pressure in said first compartment and toward said second end in response to increase of pressure in said first compartment.

3. A prime mover according to claim 1 wherein said converting means includes a portion of said chamber defining means being formed of impervious pliable material, said pliable material expanding outward in response to increase of pressure in said first compartment and contracting inward in response to decrease of pressure in said first compartment.

4. A prime mover according to claim 3 wherein said pliable material defines a bellows structure forming a plurality of pleats and an opening remote from said chamber, and an impervious closure plate spanning said opening in sealed relation thereto so that said closure plate moves toward and away from said chamber in response to pressure decrease and pressure increase therein.

5. A prime mover according to claim 1 wherein said converting means includes an impervious deformable wall disposed in said first compartment and defining a pumping chamber within said first compartment, means forming an inlet passage to said pumping chamber, and means forming an outlet passage to said pumping chamber so that fluid within said pumping chamber and said passages experiences pressure changes corresponding to the pressure changes within said first compartment.

6. A prime mover according to claim 5 including inlet and outlet check valves disposed in said passages on opposite extremities of said pumping chamber, said check valves being adapted to afford fluid flow only in the direction from said inlet passage toward said outlet passage so that fluid within said pumping chamber is pumped from said inlet passage to said outlet passage in response to periodic reversal of polarity of said current flow inducing means.

7. A prime mover according to claim 1 wherein said electrochemically active material includes a redox couple composed of hydrogen and hydrogen.

8. A prime mover according to claim 1 wherein said electrochemically active material includes a redox couple composed of oxygen and water.

9. A prime mover according to claim 1 wherein said electrochemically active material includes a redox couple composed of halogen and a halogen acid.

10. A prime mover comprising means defining a gas-tight chamber, at least two electrolytic membranes disposed in said chamber in spaced apart relation so as to form a first compartment between said membranes, a second compartment on the side of one of said membranes opposite said first compartment and a third compartment on the side of the other of said membrane's opposite said first compartment, said membranes having surfaces at the boundaries of respective said compartments, said compartments containing an electrochemically active material capable of existing in a gaseous phase and being electrochemically reversibly active so as to enter into a reduction/oxidation reaction at said electrodes and produce ions that are transportable through said membrane, a pervious electrode disposed on each said surface, means connected to said electrodes for establishing a voltage gradient across said membranes, said voltage gradient establishing means being adapted to establish gradients at a first polarity to transport ions through said membranes from said second and third compartments to said first compartment and a second polarity to transport ions through said membranes from said first compartment to said second and third compartments, a first conduit attached to said casing in communication with said first compartment, a second conduit attached to said casing in communication with at least one of said second and third compartments, first and second gas-tight expansible structures connected to respective said conduits remote from said chamber, said expansible structures adapted to expand in response to increase in pressure in the compartment with which they are associated and to contract in response to decrease in pressure in the compartment with which they are associated, and means operatively connected to at least one of said expansible chambers for converting expansion and contraction thereof to mechanical motion.

11. A prime mover according to claim 10 wherein said voltage gradient establishing means includes a power source, means for connecting said power source to said electrodes and means for periodically reversing the output polarity of said power source.

12. A prime mover according to claim 10 wherein said expansible structures include a bellow structure forming a plurality of pleats and an opening remote from said conduit, and an impervious closure plate spanning said opening in sealed relation thereto so that the closure plate moves toward and away from said conduit in response to pressure decrease and pressure increase within the compartment associated therewith.

13. A prime mover according to claim 10 wherein said second compartment has a boundary remote from said first compartment, said boundary being defined by a third electrolytic membrane, means forming a fourth compartment on the side of said third membrane opposite from said second compartment, said third membrane having gas pervious electrodes thereon that are connected to said voltage gradient establishing means so as to effect pressure changes in said fourth compartment corresponding to the pressure changes in said first compartment in response to polarity reversals in said voltage gradient establishing means, and a branch conduit establishing communication between said fourth compartment and said first conduit so that pressure changes in said fourth compartment are additive to pressure changes in said first compartment.

* * * * *